United States Patent [19]

Nakamichi

[11] Patent Number: 4,519,006
[45] Date of Patent: May 21, 1985

[54] MAGNETIC HEAD DEVICE

[75] Inventor: Niro Nakamichi, Higashikurume, Japan

[73] Assignee: Nakamichi Corporation, Tokyo, Japan

[21] Appl. No.: 449,450

[22] Filed: Dec. 13, 1982

[30] Foreign Application Priority Data

Dec. 14, 1981 [JP] Japan ................ 56-201420

[51] Int. Cl.$^3$ .............................. G11B 5/43
[52] U.S. Cl. ................................ 360/76
[58] Field of Search ............ 360/76, 75, 77, 111, 360/112, 7, 119; 29/603

[56] References Cited

U.S. PATENT DOCUMENTS

| 2,751,439 | 6/1956 | Burton | 360/76 |
| 3,959,824 | 5/1976 | Ohi et al. | 360/121 |
| 4,101,937 | 7/1978 | Jenkins | 360/76 |
| 4,258,398 | 3/1981 | Bixby et al. | 360/76 |
| 4,317,144 | 2/1982 | De Niet et al. | 360/76 |
| 4,460,934 | 7/1984 | Yamada | 360/76 X |

Primary Examiner—Aristotelis M. Psitos
Attorney, Agent, or Firm—Pearne, Gordon, Sessions, McCoy, Granger & Tilberry

[57] ABSTRACT

This invention relates to a magnetic head device. An azimuth position of a gap of a magnetic head is adjusted relative to the position of a signal on a magnetic tape in a playback mode wherein the magnetic head functions as a reproducing head, while the azimuth position of the magnetic head is returned to a predetermined reference position in response to a selection of a record mode wherein the magnetic head functions as a recording head.

4 Claims, 5 Drawing Figures

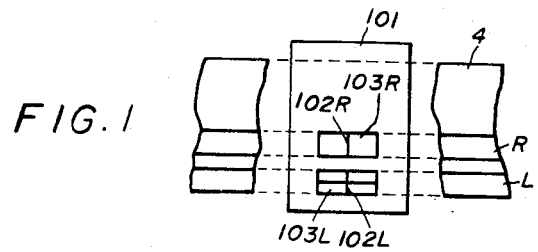
FIG.1
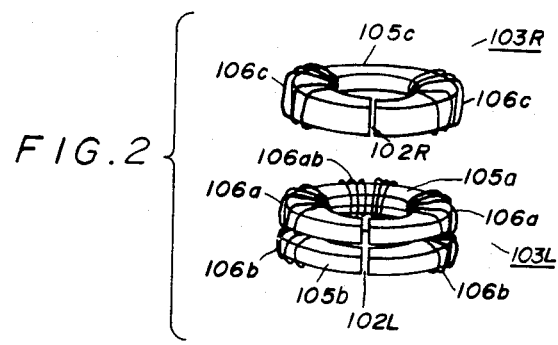
FIG.2
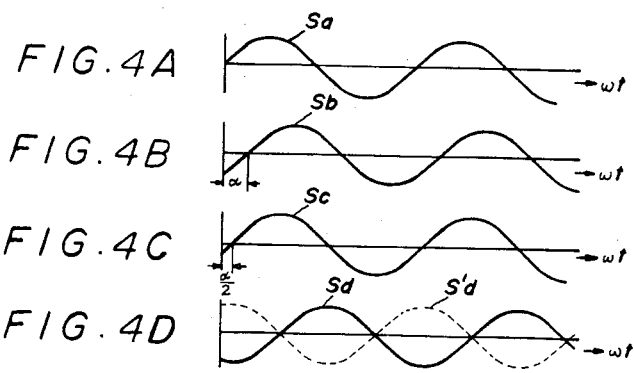
FIG.4A
FIG.4B
FIG.4C
FIG.4D

MAGNETIC HEAD DEVICE

BACKGROUND OF THE INVENTION

In a magnetic recording and reproducing apparatus, an optimum playback characteristic can be obtained if an azimuth position of a gap of a reproducing head is correctly adjusted relative to the position of a signal recorded on a magnetic tape.

U.S. Pat. No. 4,317,144 discloses a method of adjusting the azimuth position of the reproducing head by separately scanning an upper half and a lower half of a single track on which an identical signal is recorded. According to this method, the azimuth position of a gap of the reproducing head can be automatically adjusted relative to the position of a signal recorded on a prerecorded tape such as a music tape without using conventional test signals recorded on two different tracks.

In one type of magnetic recording and reproducing apparatus, however, there is provided a single magnetic head the same gap of which is used in both record mode and playback mode.

In another type, there is provided a combination magnetic head in which a reproducing head is combined with a recording head so that a different gap is used in each mode.

In case that the adjusting method of the present invention is applied to these magnetic heads and the azimuth position of them are moved and adjusted in a playback mode, the moved azimuth position should be returned to a predetermined reference azimuth position in a record mode.

SUMMARY OF THE INVENTION

Accordingly, it is a principal object of the invention to provide a magnetic head an azimuth position of which is moved and adjusted relative to the position of a signal on a magnetic tape in a playback mode and returned to a predetermined reference azimuth position in accordance with the selection of a record mode.

In accordance with the invention, there is provided a magnetic head device for a magnetic recording and reproducing apparatus comprising:

magnetic head means having a reproducing gap to separately scan an upper portion and a lower portion of a single signal track on a magnetic tape and providing two reproduced signals from said single track on which an identical signal is recorded;

means for adjusting an azimuth position of said gap of said magnetic head means relative to said signal recorded on said track in response to a phase difference between said two reproduced signals in a playback mode;

means for returning said azimuth position of said gap of said magnetic head means to a predetermined reference azimuth position;

and means for selecting operation of said adjusting means in response to said playback mode and selecting operation of said returning means in response to a record mode whereby said azimuth position of said gap is adjusted relative to said signal recorded on said track in said playback mode and is returned to said reference azimuth position in said record mode.

BRIEF DESCRIPTION OF THE DRAWINGS

The above object and feature of the invention will be apparent from the description of the embodiment taken along with reference to the accompanying drawings in which;

FIG. 1 shows a magnetic head and tape configuration;

FIG. 2 shows a perspective view of a core construction of the magnetic head shown in FIG. 1;

FIG. 4 shows waveforms of reproduced signals from the magnetic head; and

DETAILED DESCRIPTION OF THE EMBODIMENT

Figure 3:
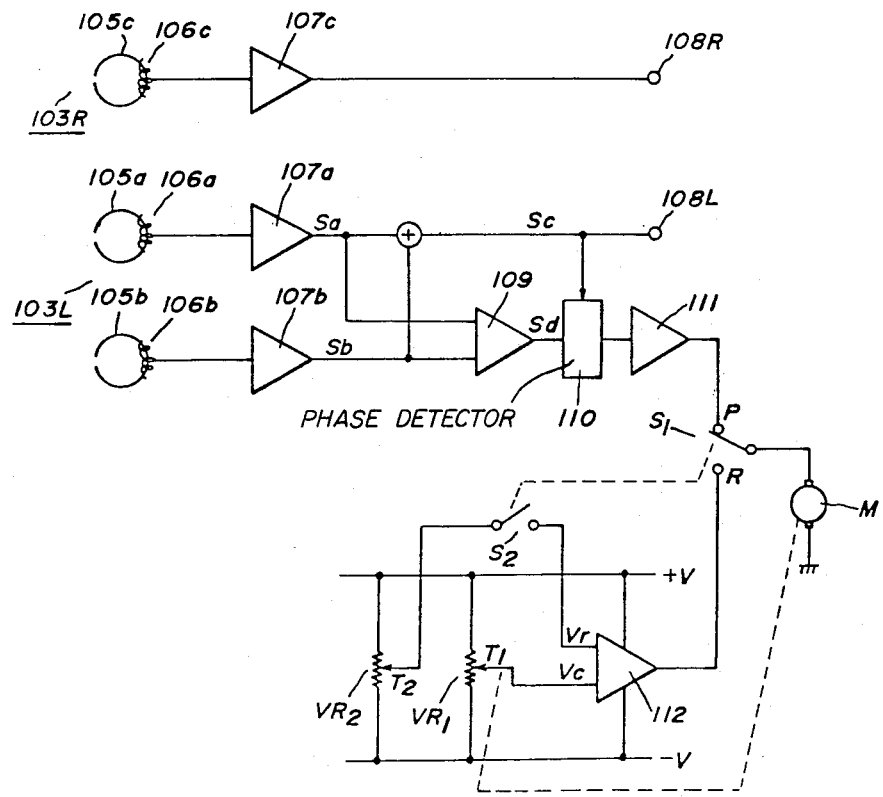
FIG. 3 shows an example of a circuit for adjusting the azimuth position of the magnetic head.

Referring now to FIGS. 1 and 2, a magnetic head 101 is a single type recording and reproducing head such that the same gaps 102L and 102R are used in both record mode and playback mode.

The magnetic head 101 comprises right and left channel cores 103L and 103R corresponding to record tracks L and R of a magnetic tape 4 on which stereo audio signals are recorded, respectively. As shown in FIG. 2, the left channel core 103L is divided into upper and lower core elements 105a and 105b with a non-magnetic layer (not shown) placed therebetween, but the right channel core 103R comprises a non-divided core element 105c. Each coil wound on the core element 105a or 105b is divided into two portions 106a, 106a or 106b, 106b, which are connected in series with each other. Similarly, a coil wound on the core element 105c is divided into two portions 106c, 106c, which are also connected in series with each other. A non-divided coil 106ab is wound to encircle both core elements 105a and 105b. The coil 106ab is used only for recording since the coils 106a and 106b are used only for reproducing, while the coil 106c is used both for recording and reproducing.

FIG. 3 shows a circuit for adjusting an azimuth position of the magnetic head 101. Although the recording circuit is omitted in FIG. 3, it should be understood that when a record mode is selected, the magnetic head is connected from the reproducing circuit to the recording circuit so that stereo recording signals are supplied to the coils 106ab and 106c, respectively.

Reproduced signals from the left channel coils 106a and 106b are supplied to inputs of reproducing amplifiers 107a and 107b, respectively. Output signals Sa and Sb from the reproducing amplifiers 107a and 107b are compounded into a left channel reproduced audio signal which is supplied to a left channel audio output terminal 108L. The output signals Sa and Sb from the reproducing amplifiers 107a and 107b are also supplied to inputs of a differential amplifier 109 which generates a differential signal Sd in accordance with the phase difference between the signals Sa and Sb. A phase detector 110 detects the phase of the differential signal Sd relative to a reference of a zero crossing point of the left channel audio signal. An output signal from the phase detector 110 is supplied to a driving circuit 111 for controlling an azimuth adjusting electric motor M.

The azimuth adjusting circuit also comprises an operational amplifier 112 having inputs connected to a variable terminal $T_1$ of a variable resistor $VR_1$ and through a switch $S_2$ to a variable terminal $T_2$ of a variable resistor $VR_2$, respectively. The variable resistors $VR_1$ and $VR_2$ are provided between electric potentials $+V$ and $-V$. The variable terminal $T_1$ of the variable resistor $VR_1$ is moved in association with a rotation of the electric motor M. A switch $S_1$ which is operated together with the switch $S_2$ is provided between the outputs of the driving circuit 111 and the operational amplifier 112. In the playback mode, the switch $S_1$ is connected to a terminal P while the switch $S_2$ is turned off, but in the record mode, the switch $S_1$ is connected to a terminal R while the switch $S_2$ is turned on.

The operational amplifier 112 stops the electric motor M when input voltages Vc and Vr from the variable resistors $VR_1$ and $VR_2$ are equal to each other, drives it to be reversely rotated when the input voltage Vc is higher than the input voltage Vr, and drives it to be forwardly rotated when the input voltage Vc is lower than the input voltage Vr.

When the electric motor M is forwardly rotated, the magnetic head 101 is inclinatorily moved in a clockwise direction as viewed in FIG. 1 and the variable voltage Vc becomes higher. When the electric motor M is reversely rotated, the magnetic head 101 is inclinatorily moved in a counterclockwise direction as viewed in FIG. 1 and the variable voltage Vc becomed lower. The reference voltage Vr is so set that when the azimuth position of the magnetic head 101 is at a reference azimuth position in the record mode, the reference voltage Vr is equal to the variable voltage Vc from the variable terminal $T_1$ of the variable resistor $VR_1$.

In operation, when the recording mode is selected, the switch $S_1$ is connected to the terminal R while the switch $S_2$ is turned on. Thus, the operational amplifier 112 to which the variable and reference voltages Vc and Vr are applied drives the electric motor M so that the variable voltage Vc approaches the reference voltage Vr to position the magnetic head 101 at the predetermined reference azimuth position.

When the playback mode is selected, the switch $S_1$ is connected to the terminal P while the switch $S_2$ is turned off. The reproduced signals Sa and Sb separately picked up by the coils 106a and 106b from the same recorded track L have waveforms as shown in FIGS. 4A and 4B when the magnetic head 101 is inclined in a clockwise direction as viewed in FIG. 1. Thus, the signal Sa is indicated by $A \sin(\omega t + \alpha/2)$ while the signal Sb is indicated by $A \sin(\omega t - \alpha/2)$. Therefore, the left channel reproduced audio signal Sc from the output terminal 108L retards by the degree of $\alpha/2$ relative to the reproduced signal Sa and advances by the degree of $\alpha/2$ relative to the reproduced signal Sb as shown in FIG. 4C. The reproduced audio signal Sc is indicated by $2A \cos \alpha/2 \sin \omega t$. The differential signal Sd from the differential amplifier 109 retards by the degree of 90° relative to the reproduced audio signal Sc and is indicated by $2A \sin \alpha/2 \cos \omega t$.

On the other hand, when the magnetic head 101 is inclined in a counterclockwise direction as viewed in FIG. 1, the differential signal S'd has a waveform as shown by a dotted line of FIG. 4D and is indicated by $-2A \sin \alpha/2 \cos \omega t$. Thus, the phase of the differential signal S'd is out of order by the degree of 180° relative to that of the differential signal Sd. When the azimuth position of the gaps 102L and 102R of the magnetic head 101 is proper relative to the recorded signal, the differential signal Sd or S'd is zero. The phase detector 110 discriminates that when the differential signal is negative at the zero crossing point of the audio signal Sc, it is Sd corresponding to the clockwise inclination of the magnetic head 101, and when the differential signal is positive, it is S'd corresponding to the counterclockwise inclination of the magnetic head 101. If the differential signal Sd is detected, then the driving circuit 111 is so controlled that the electric motor M is reversely rotated to inclinatorily move the magnetic head 101 in a counterclockwise direction. As a result, since the azimuth position of the gaps 102L and 102R of the magnetic head 101 is correctly adjusted relative to the track of the recorded signal, the left and right channel audio signals are picked up from the output terminals 108L and 108R, respectively, in an optimum condition. If the differential signal S'd is detected, the electric motor M is reversely rotated to inclinatorily move the magnetic head 101 in a clockwise direction to adjust the azimuth position of the gaps 102L and 102R of the magnetic head 101 relative to the track of the recorded signal.

When the recording mode in which audio signals are recorded on a magnetic tape is selected, the switch $S_1$ is connected to the terminal R while the switch $S_2$ is turned on. If the azimuth position of the magnetic head 101 moved in the playback mode is out of the reference azimuth position, the variable voltage Vc is different from the reference voltage Vr. Thus, the operational amplifier 112 controls the electric motor M to be rotated in a selected direction until the voltages Vc and Vr becomes equal to each other so that the azimuth position of the magnetic head 101 is at the reference azimuth position. Thus, it will be noted that the magnetic head 101 is always returned to the reference azimuth position in response to the selection of the record mode.

Although, in the illustrated embodiments, the left channel core is divided, it will be understood that the right channel core may be divided. The reproduced signals Sa and Sb may be converted into square wave signals which may be compared to form a differential signal varying in its width of pulse in response to the phase difference of the square wave signals. The differential signal of pulse can control the electric motor to a reproducing head or to a multi-channel head.

Figure 5:
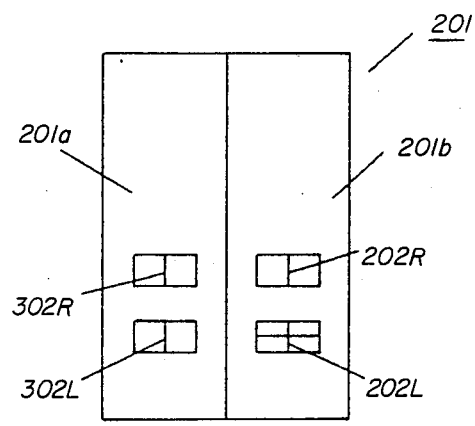
FIG. 5 shows a front view of a combination magnetic head assembly.

In the aforementioned embodiment, the invention is applied to the single type recording and reproducing head having the same gaps for use in both record and playback modes, but also it may be applied to a combination magnetic head assembly 201 as illustrated in FIG. 5. The combination magnetic head assembly 201 comprises a recording head 201a and a reproducing head 201b which are integrally bonded to each other. The recording head 201a has recording gaps 302R and 302L for right and left channels, while the reproducing head 201b has reproducing gaps 202R and 202L for right and left channels corresponding to those of the recording gaps.

While one preferred embodiment of the invention has been illustrated and described with reference to the accompanying drawings, it will be understood by those skilled in the art that various changes and modifications may be made without departing from the spirit and scope of the invention, which is intended to be defined only to the appended claims.

What is claimed is:

1. A magnetic head device for a magnetic recording and reproducing apparatus comprising:
    magnetic head means having a reproducing gap to separately scan an upper portion and a lower portion of a single signal track on a magnetic tape and providing two reproduced signals from the single track on which an identical signal is recorded;

means for determining a difference in phase between said two reproduced signals in a playback mode;

means for adjusting the azimuth position of said gap of said magnetic head means relative to the signal recorded on the track in response to a phase difference between said two reproduced signals in a playback mode;

means for returning said azimuth position of said gap of said magnetic head means to a predetermined reference azimuth position;

and means for selecting operation of said adjusting means in response to said playback mode and selecting operation of said returning means in response to a record mode whereby said azimuth position of said gap is adjusted relative to said signal recorded on the track in said playback mode and is returned to said reference azimuth position in said record mode.

2. A magnetic head device as set forth in claim 1, wherein said magnetic head means is a recording and reproducing head such that the same gap is used in both record mode and playback mode.

3. A magnetic head device as set forth in claim 1, wherein said magnetic head means is a combination head in which a reproducing head is combined with a recording head so that a different gap is used in each of the record and playback modes.

4. A magnetic head device as set forth in claim 1, wherein said magnetic head means is a combination magnetic head having an exclusive recording gap and an exclusive reproducing gap.

* * * * *